I. BERTIN.
STARTING MECHANISM FOR POWER SHAFTS.
APPLICATION FILED JAN. 30, 1918.

1,281,486.

Patented Oct. 15, 1918.

Inventor
Isaac Bertin
By his Attorneys

UNITED STATES PATENT OFFICE.

ISAAC BERTIN, OF NEW YORK, N. Y.

STARTING MECHANISM FOR POWER-SHAFTS.

1,281,486.　　　　　　Specification of Letters Patent.　　Patented Oct. 15, 1918.

Application filed January 30, 1918. Serial No. 214,474.

*To all whom it may concern:*

Be it known that I, ISAAC BERTIN, a citizen of the United States, and residing at New York, in the county of New York and State of New York, have invented certain new and useful Improvements in Starting Mechanisms for Power-Shafts, of which the following is a specification, such as will enable those skilled in the art to which it appertains to make and use the same.

This invention relates to starting mechanisms for power shafts, such as gas engine crank shafts, steam engine shafts and the like, and the object of the invention is to provide a device of this class which is simple in construction and operation and efficient in use and is specially designed for use in connection with automobile engines, whereby the same may be cranked from the driver's seat of the vehicle.

The invention is fully disclosed in the following specification, of which the accompanying drawing forms a part, in which the separate parts of my improvement are designated by suitable reference characters in each of the views, and in which:—

Figure 1 is a sectional plan view of my improved starting mechanism and indicating its connection with the frame work of the vehicle;

Fig. 2 a partial section on the line 2—2 of Fig. 1; and,

Fig. 3 a view similar to Fig. 2 but showing the parts in a different position.

In the drawing I have indicated at $a$ the front side members of the chassis frame of an automobile, and at $b$ I have shown the end of a crank shaft in which the starting pin $b^2$ is mounted.

In the practice of my invention, I employ a frame $c$ which may be secured to the chassis frame of the vehicle, as clearly indicated at $c^2$, or may be secured to any other part of the framework of the vehicle, and said frame is provided with forwardly directed arms $c^3$ in which is mounted a transverse shaft $d$, centrally of which is secured a segmental spiral gear $e$ which meshes with a spiral gear $e^2$ mounted on a shaft $f$ having a bearing in the frame $c$ at $c^4$. The other end of the shaft $f$ is provided with a starting crank ratchet or clutch head $g$ having a plurality of teeth-like projections $g^2$ which are adapted to operate in connection with the starting pin $b^2$ on the end of the shaft $b$.

Secured to one end of the shaft $d$ is a lever $h$ to the end of which is pivoted a link rod $i$ which is pivoted to a hand-operated lever $j$ as shown at $i^2$, and the lever $j$ is pivoted to a shaft $j^2$ mounted in the frame work of the vehicle in any desired manner.

The position of the parts shown in Figs. 1 and 2 is the normal position thereof, or the position said parts assume when the vehicle is at a stand still, or when in operation, and when it is desired to crank the engine the hand lever $j$ is moved from the position indicated in dotted lines at $x$ in Fig. 3 to the full line position indicated in said figure, and this movement is continued until said lever is indicated at $x^2$ in Fig. 3, which operation first rotates the shaft $d$ which in turn rotates the spiral gear segment $e$, and moves the spiral gear $e^2$ and the shaft $f$ with the starting crank ratchet or clutch head $g$ thereon into the position shown in Fig. 3, after which the shaft $f$ is rotated by the further rotation of the spiral gear segment $e$ which operates the spiral gear $e^2$ to accomplish this result, and the shaft $b$ which is integral with, or in operative connection with the crank shaft of the engine is correspondingly rotated.

It will be understood that the lever $j$ is moved backwardly by hand into its normal position and the above operation may be repeated a number of times, if the first operation did not accomplish the desired result.

It will be noted that with my improvement the driver of the vehicle may start the engine, while sitting in the drive seat and accomplish this result with a minimum amount of exertion by reason of the construction of my improved starter, and it will be understood that my invention is not limited to the specific means, herein shown and described, for supporting my improved mechanism, nor to the location thereof, and changes in and modifications of the details of construction as shown may be made, within the scope of the appended claims, without departing from the spirit of my invention, or sacrificing its advantages.

Having fully described my invention, what I claim as new and desire to secure by Letters Patent, is:—

1. A starting mechanism of the class described, comprising a shaft, a spiral gear segment mounted on said shaft, another shaft mounted at right angles to said first-named shaft, a spiral gear on said last named shaft and operated by said gear segment and a clutch head connected with said shaft and in operative connection with the crank shaft of an engine, and means for operating the first-named shaft.

2. In a device of the class described, a frame, a main shaft mounted in said frame, a supplemental shaft movably mounted in said frame at right angles to the main shaft, a spiral gear secured to one end of the supplemental shaft, a spiral gear segment secured to the main shaft and in operative connection with said gear, and means for operating the main shaft to move said supplemental shaft longitudinally and for rotating said shaft by means of said gear and spiral gear segment.

3. In a device of the class described, a frame, a main shaft mounted in said frame, a supplemental shaft movably mounted in said frame at right angles to the main shaft, a spiral gear secured to one end of the supplemental shaft, a spiral gear segment secured to the main shaft and in operative connection with said gear, a clutch member mounted on the other end of the supplemental shaft, a hand-operated lever mounted adjacent to the driver's seat of a vehicle, a link rod pivoted to said lever, and a lever secured to the main shaft and with which said link rod is pivotally connected whereby the operation of said hand-operated lever will rotate the main shaft to move the clutch head on the end of the supplemental shaft into operation with the crank shaft of an engine and rotate said shaft by means of the gear and spiral gear segment on said shaft.

4. In a device of the class described, a frame, a main shaft mounted in said frame, a supplemental shaft movably mounted in said frame at right angles to the main shaft, a spiral gear secured to one end of the supplemental shaft, a clutch member mounted on the other end of said shaft, a spiral gear segment secured to the main shaft and in operative connection with the spiral gear on the supplemental shaft, a crank mounted on one end of the main shaft, a lever mounted adjacent to the driver's seat of the vehicle, and a link rod pivoted to said lever and to the crank on the end of the main shaft.

5. The combination with the front portion of the chassis frame of a vehicle, of a frame having forwardly directed bearing members, a main shaft mounted in said bearing members, a supplemental shaft movably mounted in said frame centrally thereof and in a plane at right angles to the main shaft, a spiral gear secured to one end of the supplemental shaft, a clutch member secured to the other end of said shaft, a spiral gear secured to the main shaft and in operative connection with the spiral gear on the supplemental shaft, an operating lever mounted in the frame of the vehicle adjacent to the driver's seat, and means for placing said lever in operative connection with said main shaft.

In testimony that I claim the foregoing as my invention I have signed my name in presence of the subscribing witnesses this 25th day of January, 1918.

ISAAC BERTIN.

Witnesses:
C. E. MULREANY,
H. E. THOMPSON.